(12) United States Patent
Kalkbrenner et al.

(10) Patent No.: US 11,371,927 B2
(45) Date of Patent: Jun. 28, 2022

(54) METHOD AND DEVICE FOR OPTICALLY EXAMINING A PLURALITY OF MICROSCOPIC SAMPLES

(71) Applicant: Carl Zeiss Microscopy GmbH, Jena (DE)

(72) Inventors: Thomas Kalkbrenner, Jena (DE); Joerg Siebenmorgen, Jena (DE); Thomas Ohrt, Golmsdorf (DE)

(73) Assignee: Carl Zeiss Microscopy GmbH, Jena (DE)

( * ) Notice: Subject to any disclaimer, the term of this patent is extended or adjusted under 35 U.S.C. 154(b) by 306 days.

(21) Appl. No.: 16/648,863

(22) PCT Filed: Sep. 25, 2018

(86) PCT No.: PCT/EP2018/075949
§ 371 (c)(1),
(2) Date: Mar. 19, 2020

(87) PCT Pub. No.: WO2019/063539
PCT Pub. Date: Apr. 4, 2019

(65) Prior Publication Data
US 2020/0284715 A1    Sep. 10, 2020

(30) Foreign Application Priority Data
Sep. 29, 2017   (DE) .................... 10 2017 122 718.0

(51) Int. Cl.
*G02B 21/16* (2006.01)
*G01N 15/14* (2006.01)
*G02B 21/08* (2006.01)

(52) U.S. Cl.
CPC ....... *G01N 15/1434* (2013.01); *G01N 15/147* (2013.01); *G02B 21/082* (2013.01); *G02B 21/16* (2013.01); *G01N 2015/144* (2013.01)

(58) Field of Classification Search
CPC ............. G01N 15/1434; G01N 15/147; G02B 21/082; G02B 21/16
(Continued)

(56) References Cited

U.S. PATENT DOCUMENTS

2006/0033987 A1   2/2006 Stelzer et al.
2010/0239138 A1   9/2010 Lippert et al.
(Continued)

FOREIGN PATENT DOCUMENTS

DE           102 57 423 A1    6/2004
DE    10 2005 028 893 B4   12/2007
(Continued)

OTHER PUBLICATIONS

Shields IV, C.W., et al.; "Microfluidic Cell Sorting: A Review of the Advances in the Separation of Cells from Debulking to Rare Cell Isolation"; Lab on a Chip 2015; 15(5):1230-1249.
(Continued)

*Primary Examiner* — Nguyen T Truong
(74) *Attorney, Agent, or Firm* — Duane Morris LLP

(57) ABSTRACT

A method for optically examining a plurality of microscopic samples. The samples are channeled one after the other by means of a flow into at least one flow channel in which the samples advance along a flow direction. The samples are illuminated, and light emitted from the samples is detected and analyzed. A device for carrying out the method in which samples are illuminated in that at least one light sheet with a light sheet plane is directed onto the at least one flow channel, wherein the light sheet is oriented so as to intersect the at least one flow channel in an intersection region, and the normal of the light sheet plane forms an angle differing from null together with the flow direction in the intersection region. The light emitted from the sample is registered by an
(Continued)

imaging optical detection unit, and the focal plane of said optical detection unit lies in the intersection region.

16 Claims, 5 Drawing Sheets

(58) Field of Classification Search
USPC .......................................................... 250/435
See application file for complete search history.

(56) References Cited

U.S. PATENT DOCUMENTS

| | | |
|---|---|---|
| 2012/0219985 A1 | 8/2012 | Yoon et al. |
| 2013/0286181 A1 | 10/2013 | Betzig et al. |
| 2015/0253560 A1 | 9/2015 | Otte et al. |
| 2016/0097028 A1 | 4/2016 | Tung et al. |
| 2016/0154236 A1 | 6/2016 | Siebenmorgen et al. |
| 2016/0170195 A1 | 6/2016 | Siebenmorgen et al. |
| 2016/0291303 A1 | 10/2016 | Degen et al. |
| 2016/0291304 A1 | 10/2016 | Singer et al. |
| 2017/0269345 A1 | 9/2017 | Siebenmorgen et al. |
| 2018/0203217 A1 | 7/2018 | Knebel et al. |
| 2018/0275045 A1* | 9/2018 | Bassi ................. G01N 15/1434 |

FOREIGN PATENT DOCUMENTS

| | | |
|---|---|---|
| DE | 10 2007 048 409 A1 | 4/2009 |
| DE | 10 2012110 077 A1 | 6/2014 |
| DE | 10 2013 1 07 297 A1 | 1/2015 |
| DE | 10 2013 107 298 A1 | 1/2015 |
| DE | 10 2013 112 596 A1 | 5/2015 |
| DE | 10 2013 112 600 A1 | 5/2015 |
| EP | 3 144 662 A1 | 3/2017 |
| KR | 1020140071997 A | 6/2014 |
| WO | 2004053558 A1 | 6/2004 |
| WO | 2006136147 A2 | 12/2006 |
| WO | 2012110488 A2 | 8/2012 |
| WO | 2012122027 A2 | 9/2012 |
| WO | 2015071363 A1 | 5/2015 |
| WO | 2017013054 A1 | 1/2017 |
| WO | 2017137779 A1 | 8/2017 |

OTHER PUBLICATIONS

Gast, F.-U, et al.; "The microscopy cell (MicCell), a versatile modular flowthrough system for cell biology, biomaterial research, and nanotechnology"; Microfluid Nanofluid 2006; 2:21-36.

Hulsken, J., et al.; "Selective Plane Illumination Microscopy Techniques in Developmental Biology"; Development Bd. 2009; 136:1963-1975.

German Search Report dated Jun. 21, 2018.

International Search Report dated Jan. 16, 2019.

Regmi, Raju, et al.; "High resolution light-sheet based high-throughput imaging cytometry system enables visualization of intra-cellular organelles"; AIP Advances 2014; 4:097125-1-097125-7.

Notification of Transmittal of Translation of International Preliminary Report on Patentability with English Translation of International Preliminary Report on Patentability dated Apr. 9, 2020.

* cited by examiner

METHOD AND DEVICE FOR OPTICALLY EXAMINING A PLURALITY OF MICROSCOPIC SAMPLES

RELATED APPLICATIONS

The present application is a U.S. National Stage application of International PCT Application No. PCT/EP2018/075949 filed on Sep. 25, 2018, which claims priority benefit of German Application No. DE 10 2017 122 718.0 filed on Sep. 29, 2017, the contents of each are incorporated by reference in their entirety.

FIELD OF THE INVENTION

The invention relates to a method for optically examining, more particularly for manipulating, for imaging and for analyzing, a multiplicity of microscopic samples, more particularly biological samples, in which the samples are channeled from the multiplicity thereof and successively guided in at least one flow channel by means of a flow and said samples move therein along a specified flow direction. The samples are illuminated in the flow channel and the light emitted from the samples is detected and analyzed.

The invention also relates to an apparatus for optically examining a multiplicity of microscopic samples, said apparatus also being suitable for carrying out the aforementioned method in particular. Such an apparatus comprises a channeling device for channeling the samples and for successively feeding said samples into at least one flow channel, in which the samples move along a specified flow direction—specified by a pumping and discharge apparatus, for example. The apparatus moreover comprises illumination means for illuminating the samples in the flow channel for the purposes of emitting detection light; it furthermore comprises detection means for detecting the detection light emitted from the sample and analysis means for analyzing the detection light.

PRIOR ART

In the past fifty years, flow cytometry has established itself as one of the most important measurement methods for the examination of cell populations in large numbers in order to obtain quantitative information about the type and number of cells. In the process, cells are guided, essentially in individual fashion, past a light beam for illumination or past a means for sample manipulation, for example a voltage, at a comparatively high speed. Depending on the cell properties such as the structure, shape or staining of the cells, for example with fluorescent markers, the manipulation leads to different results, which are detected and which allow conclusions to be drawn about the properties of the cells. In addition to mechanical or quasi-mechanical interventions, for example by means of optical tweezers, the term manipulation should also mean the change in a property of the sample due to an external intervention. A light beam can also manipulate the sample if for example, the sample is labeled with fluorescent markers and excited by the light beam to emit fluorescence light. Only signals are detected in conventional flow cytometry; however, two- or three-dimensional image information, which would be desirable for an even more precise analysis and/or further diversified cataloging, cannot be collected.

In flow cytometry, samples are separated from a batch of samples, which contains a multiplicity of microscopic samples—this is understood to mean individual objects, for example cells—that generally are in a carrier fluid, by means of a channeling device and are directed into a microchannel, generally with the aid of a so-called sheath flow. By way of example, the separation can be effected by means of a funnel-shaped opening to the microchannel—which may be adjustable in terms of its diameter. The microchannel—generally embodied on a microfluidic chip these days—generally has a diameter chosen to be so large that cells with typical dimensions—between 1 µm and 30 µm—do not get stuck therein, but also chosen to be so small that all cells that pass through the microchannel are also captured by the manipulation medium, for example a laser beam, provided that there is no fluidic focusing in the channel on the line of intersection with the laser beam. Provided that the frequency of the laser beam is matched to a fluorescent marker, a sample labeled with the marker is excited to emit a fluorescence signal when it passes through said laser beam, the fluorescence signal being registered by a detector aligned with the intersection region between the laser beam and the flow channel. As a rule, simple photodetectors are sufficient in this case, since imaging with an imaging optical unit is not required for the quantitative analysis. For samples not labeled with fluorescent markers or in addition to fluorescence, the scattered light of said samples can be registered in different directions.

The detected measured values are evaluated in an analysis unit and quantitative information about each analyzed cell is obtained. The number of samples that can be analyzed per second is of the order of $10^4$, and so representative information about the individual samples, e.g., cell populations occurring in the multiplicity of samples, is obtained within a very short time. Here, a plurality of lasers, which each emit light at different wavelengths, can be positioned at the flow channel and can be coupled to corresponding detectors, allowing the analysis of a multiplicity of different samples. The analysis of scattered light is also an option in addition to the analysis of fluorescence signals.

Sorting by means of a sorting device can follow the flow cytometric measurement. The samples are sorted into different channels on the basis of the analysis results. If this has not already been done prior to the analysis, the samples are separated, for example with the aid of a vibrator which is disposed downstream of the illumination means, which is also referred to as an excitation means in the case of excitation for fluorescence, in the flow direction and which divides the liquid flow into small droplets that usually contain only one cell; this followed by electrostatic sorting. An overview of flow cytometric methods including sorting mechanisms is given, for example, in the article "*Microfluidic Cell Sorting: A Review of the Advances in the Separation of Cells from Debulking to Rare Cell Isolation*" by CW Shields IV et al., published in Lab Chip. 15(5), pp. 1230-1249 in 2015.

Although a high sample throughput can be achieved with these methods, imaging is generally not carried out since focusing cannot be carried out at these speeds. One solution lies in the use of an optical unit with a fixed focal length and a small aperture; this leads to an increased depth of field but also to a darker image. This disadvantage is at least partly compensated by special image processing. However, this so-called "extended depth of field" (EDOF) approach increases the technical complexity, and hence the costs, and the achievable resolution in the image is low on account of the small aperture. A flow cytometer with combined imaging is the ImageStreamX Mark II imaging flow cytometer by Merck KGaA, for example.

Modern flow cytometers often use the "lab-on-chip" approach; this relates to microfluidic systems that use special sample carriers equipped with microstructured channels that have inflows and outflows. The microstructured channels can have different embodiments depending on the application. By way of example, a plurality of microstructured channels can cross for the purposes of generating reactions; a simple channel is sufficient for a simple flow cytometric analysis. The sample carriers with the microstructured channels—also referred to as channel carriers— can be disposed on corresponding sample holders or sample stages of an inverted microscope such that the channels can also be observed by means of inverted microscopy, as described, for example, in an article by F.-U. Gast et al., "*The microscopy cell (MicCell), a versatile modular flow-through system for cell biology, biomaterial research, and nanotechnology*", published in *Microfluid Nanofluid* 2, pp. 21-36 in 2006. The observation is mostly confocal and therefore restricted to small areas.

Moreover, light sheet microscopic methods and apparatuses for examining biological samples are now established in the prior art. In this case, the samples are illuminated by a light sheet, i.e., substantially only in one plane, of the light sheet plane. With the detection direction, which, as a rule, corresponds to the optical axis of a detection objective, the light sheet includes a non-zero angle and usually a right angle. Using this technique, which is also referred to as SPIM (selective plane illumination microscopy), spatial recordings of even relatively thick samples can be produced within a relatively short time. Using light sheet microscopic methods, there can be a visual, spatially extended representation of the samples on the basis of optical sections combined with a relative movement of the sample in a direction perpendicular to the section plane.

The SPIM technique is preferably used in fluorescence microscopy, where it is also referred to as LSFM (Light Sheet Fluorescence Microscopy). The LSFM technique has a number of advantages over other established methods such as confocal laser scanning microscopy or two-photon microscopy. Since the detection can be undertaken in the wide field, relatively large sample regions can be captured more quickly. Although the resolution is slightly lower than in confocal laser scanning microscopy, thicker samples can be analyzed using the LSFM technique in the case of static samples due to a greater penetration depth. Moreover, this method has the lowest light exposure of the samples, reducing the risk of bleaching and, in particular, of photo-damage to a sample since the sample is only illuminated by a thin light sheet at a non-zero angle with respect to the detection direction.

The light sheet can be generated both statically, for example with the aid of cylindrical lenses, or quasi-statically, by virtue of the sample being scanned quickly in one plane by means of a light beam. The light sheet-type illumination arises when the light beam undergoes a very fast relative movement with respect to the sample under observation, which is repeated multiple times in temporal succession so as to line up. There are various methods for shaping the light sheet; by way of example, use can be made of so-called sinc$^3$ light sheets, light sheets produced on the basis of Mathieu rays or Bessel rays, or else light sheets which are produced with the aid of gratings, as is the case in US 2013/286181 A1, for example.

When use is made of quasi-static light sheets, the integration time of a connected camera, on the sensor of which the sample is ultimately imaged, is selected in such a way that the scanning is completed within the integration time.

Instead of a camera with a two-dimensional sensor, a line sensor can also be used in combination with renewed scanning in the detection optical unit. The SPIM technique is now widely described in the literature, for example in DE 102 57 423 A1 and in WO 2004/053558 A1 based thereon, or in the review article "*Selective Plane Illumination Microscopy Techniques in Developmental Biology*" by J. Huisken et al., published in 2009 in the magazine Development vol. 136, pp. 1963 ff. WO 2012/110488 A2 and WO 2012/122027 A2 describe structures in which the illumination objective and the detection objective are perpendicular to one another and each directed at the sample from above at an angle of 45°. Then, the sample is in a Petri dish, for example. Inverse light-sheet microscopic arrangements are also known in the prior art, for example from DE 10 2013 107 297 A1, DE 10 2013 107 298 A1, DE 10 2013 112 596 A1 or DE 10 2013 112 600 A1. Since the light in the light sheet microscopes with an inverse arrangement passes obliquely through the sample carrier, it is necessary to use correction elements for the purposes of compensating, by means of correction elements, aberrations caused by this oblique light passage, as disclosed in the cited documents.

DESCRIPTION OF THE INVENTION

The object of the invention is to develop a method and an apparatus of the type set forth at the outset, in such a way that, firstly, there is an increase in sensitivity and flexibility in comparison with the flow cytometric methods and apparatuses known in the prior art and, secondly, the most detailed image information is made available at the same time.

For a method of the type set forth at the outset, this object is achieved by virtue of the samples being illuminated by virtue of at least one light sheet with a light sheet plane being directed on the at least one flow channel and the light sheet being aligned so that it intersects the at least one flow channel in an intersection region and the normal of the light sheet plane includes a non-zero angle with the flow direction in the intersection region. The light emitted from the samples is registered by an imaging detection optical unit, i.e., a detection optical unit that images and detects over an area, the focal plane of which lies in the intersection region.

By way of example, the emitted light is scattered light or reflected light; in this case, the samples emit light passively without being excited to this end. Particularly preferably, the method can also be used for samples that are labeled with fluorescent markers prior to the examination, which facilitates the identification of cells, for example. The samples are excited by the at least one light sheet to emit fluorescence signals, which are registered by the detection optical unit. In this case, the samples actively emit light.

Thus, the illumination or excitation of the samples provided with fluorescent markers is not carried out by means of a simple laser beam in this case, but rather with the aid of a light sheet—likewise generated by laser light—which is oriented such that it intersects the at least one flow channel in an intersection region. The term intersection region should be understood as follows: In the case of an ideal light sheet with an infinitesimal thickness along the direction of the normal of the light sheet plane, the intersection region is a two-dimensional intersection area in the light sheet plane from a section of the light sheet through the volume of the flow channel, the intersection area being delimited by the channel edge. In reality, however, the light sheet has a finite extent along the normal of the light sheet plane—the upper limit for the light sheet thickness is between 5 µm and 30

μm; although this is considerably smaller than the extent in the light sheet plane, it ensures that the intersection region is an intersection volume whose thickness along the normal of the light sheet plane in the region of the best possible focusing is approximately 0.4 μm-3 μm, including these values. A substantial advantage of the use of a light sheet—in the case of appropriate focusing—lies in its areal extent, which allows the analysis of even a plurality of channels at the same time should use be made, for example, of channel carriers with a multiplicity of flow channels disposed in parallel.

In principle, the light sheet can also be aligned perpendicular to the flow direction for illumination purposes and, in particular, for generating fluorescence signals if only a quantitative analysis is needed; then, the fluorescence signals can be detected and analyzed in the usual way, for example by means of photodetectors, i.e., without an imaging detection optical unit, wherein, in comparison with the use of a single laser beam, a plurality of flow channels can advantageously be analyzed simultaneously. Then, only the light sheet is taken from a SPIM arrangement; the imaging detection optical unit, i.e., an image-producing detection optical unit, is dispensed with, however.

However, a particularly advantageous aspect of the invention consists in the inclined alignment of the light sheet, which is understood to mean that the normal of the light sheet plane includes a non-zero angle with the flow direction. The flow direction in the generally substantially tubular flow channel is oriented along the longitudinal extent of the channel, i.e., perpendicular to its cross section, and also depends on the flow direction through the flow channel. The flow direction and, in particular, the absolute value of the flow velocity can be controlled from the outside, for example using appropriate pump apparatuses.

The non-zero angle allows the use of a detection optical unit, as is usually used in light sheet microscopy, and the positioning thereof in such a way that the focal plane lies in the intersection region, ideally directly in the light sheet plane or at least parallel thereto such that the whole—oblique—cross section of the flow channel lies in the intersection region in the focal plane. Since the entire cross section of the flow channel is captured, use can also be made of relatively large channels, i.e., the channel size can be chosen independently of the sample size. This facilitates the recording of snapshots of the sectional images of the samples typical for light sheet microscopy in the intersection region, i.e., two-dimensional images of the samples passing through the intersection region. In addition to covering a large or even the entire oblique cross section of the flow channel, an oblique alignment of the light sheet relative to the flow direction in microfluidics advantageously allows the use of objectives with a high numerical aperture and short working distances. The detection optical unit can be used not only for the generation of images, but also for the registration of the fluorescence signals for the quantitative analysis, as are carried out in flow cytometric examinations; then, additional detection devices are not required. The imaging detection optical unit thus not only registers the fluorescence signals but simultaneously also images the sample, passing through the intersection region in the focal plane, onto a corresponding area sensor, at least in a snapshot, and so at least one two-dimensional recording of the sample can be generated as said sample passes through the intersection region.

On account of the inclined orientation of the light sheet with respect to the flow direction, a sectional image through the entire sample is obtained even for a snapshot. In conjunction with the flow speed and flow direction, however, an image stack of individual images of the samples flowing through the intersection region can be recorded sequentially in time; the individual images of an image stack can then optionally be combined to form a spatial representation.

Moreover, the detection optical unit is always focused on the light sheet plane or a plane in the intersection region without further measures; additional measures, for example for increasing the depth of field (EDOF), can therefore be dispensed with. While in flow cytometry with laser beams the laser beam, as a rule, only covers a portion of the flow channel and the particles have to be focused on this portion by means of appropriate flow focusing, the light sheet, as a rule, covers the entire flow channel in cross section or in the intersection region, or at least a large part thereof, and so particle focusing can be dispensed with in this case. In principle, on account of the imaging, it is therefore also possible, in a flow channel with a relatively large cross section, to manipulate and analyze a plurality of samples—in particular cells—that are simultaneously located in the intersection region in a snapshot. In contrast to conventional flow cytometry, the exciting laser beam does not need to be focused to generate a maximum signal, which renders particle focusing necessary in that case because the diameter of the flow channel cannot be reduced to the diameter of the focused laser beam.

While imaging in flow cytometry is only possible in the prior art if use is made of an extended depth of field approach (EDOF approach), which necessitates the use of small apertures for imaging, such measures can be dispensed with when using a light sheet microscopy arrangement for illumination and detection purposes: The detection objective is focused on the light sheet plane and the depth of field corresponds to the thickness of the intersection region along the direction of the normal of the light sheet plane and is substantially smaller than the extent of the samples. It is therefore possible to use objectives with a large aperture angle in the detection optical unit, resulting in a high resolution, which grows with the aperture angle of the objective as a matter of principle. The numerical aperture of the objective can be further increased and the resolution can be further increased by using immersion media.

The method can be combined with the method of masked or off-axis illumination (oblique illumination) in order to increase the contrast. In this case, the off-axis illumination is coupled into the illumination objective in a different color, for example; alternatively, a separate objective could also be used. A contrast recording of the sample can be created in this way, for the purposes of which a spectrally separate channel is used for illumination and detection. The image data can be combined into an overall image of the sample with a higher contrast.

Following the analysis of the fluorescence signals on the basis of these signals, the samples can be sorted using measures as known from the prior art.

Since the light sheet can cover a substantially larger area than the diameter of a flow channel for microfluidics, it is readily possible to align the light sheet in such a way that it intersects a multiplicity of flow channels. This allows the throughput to be substantially increased, leading to an increase in the efficiency of the process for flow cytometric and imaging analyses.

Moreover, the samples can also be illuminated by a plurality of light sheets, the light sheet planes preferably lying parallel with respect to one another. Here, a plurality of similar light sheets can be disposed in succession along the flow direction, facilitating a repeat observation of one and the same object, i.e., the sample separated from the sample batch. A plurality of light sheets with different spectral properties can also be used, for example to observe multi-color excitations. Then, these light sheets can also be overlaid on one another; then, the multi-color excitation takes place simultaneously. Arranging the similar or different light sheets in succession also allows the observation of optical manipulations over time. By way of example, a first light sheet can implement a manipulation that leads to a reaction in the sample. The second light sheet is used to observe a first property and, if necessary, further light sheets can be used to observe further properties, which can also be overlaid. The time that the sample requires to travel the distance between the first and second light sheet can be set by setting the flow speed, for example by way of valves.

Depending on the type of properties to be examined, the second and optionally further light sheets can be overlaid on one another or disposed with a distance therebetween in the flow direction. There is a spatial distance between the first and the second light sheet. In the case of an appropriate configuration of the at least one flow channel, it is also possible for the light sheet to intersect the at least one flow channel a plurality of the times in intersection regions; this allows the behavior of the samples over time to be examined. By way of example, this can be achieved by means of meandering flow channels; arcuate arrangements of the flow channels are also conceivable.

If many flow channels are used, an individual spectral property can moreover be assigned to each of the parallel channels or channel groups by virtue of using special filter arrangements or gradient emission filters.

Moreover, the object is achieved for an apparatus of the type set forth at the outset by virtue of illumination means comprising an illumination optical unit for generating at least one light sheet with a light plane, wherein the light sheet is aligned with respect to the flow channel so that it intersects the flow channel in an intersection region and the normal of the light sheet plane includes a non-zero angle with the flow direction in the intersection region, as a result of which the samples are illuminated in the intersection region. The detection means comprise an imaging detection optical unit, the focal plane of which lies in the intersection region.

A description related to apparatus features is analogously applicable to the corresponding method with respect to these features, while method features correspondingly represent functional features of the apparatus described.

Expediently, the illumination means are embodied to emit light at specific wavelengths or wavelength ranges for the purposes of exciting samples that have been labeled with fluorescent markers; in that case, the samples emit fluorescence signals. Then, the fluorescence signals can be detected over an area by the imaging detection optical units. However, the detection means could also comprise further detectors, for example pure photodetectors, by means of which it is possible to detect fluorescence signals and/or scattered light should the focus be on a quantitative analysis.

In an apparatus according to the invention, the at least one flow channel is advantageously embodied on an interchangeable channel carrier, for example a microfluidic chip. This facilitates a targeted adaptation to different samples and analysis processes. By way of example, a multiplicity of parallel flow channels that are intersected by the light sheet could be disposed on the channel carrier, i.e., each of the flow channels has an intersection region with a light sheet. This facilitates a higher throughput of samples on account of the parallelization and can be used, in particular, when a multiplicity of samples should be analyzed and the focus is not on an imaging representation; however, the latter can likewise readily be integrated using an area detector: Using the detection optical unit and a camera connected thereto, certain regions on the detector can be uniquely assigned to certain channels on an area detector of the camera so that each of the flow channels can be evaluated separately. If only a quantitative analysis is important, all flow channels on the channel carrier can have a common feed line and a common discharge line. However, the provision of a dedicated feed and/or discharge line for each of the channels or a combination of the channels into groups is also possible, depending on the analyses to be carried out.

A sorting unit can be disposed downstream of the light sheet in the flow direction in at least one flow channel, said sorting unit guiding the samples to one of a plurality of branch channels adjoining the flow channel, depending on the result of the analysis. This sort can be implemented using processes known from the prior art, for example in optical, acoustic or electrophoretic fashion.

In order to observe the behavior of labeled or manipulated samples over time, the sample has to be observed multiple times. Therefore, the illumination means comprise an illumination optical unit or a plurality of illumination optical units for producing a plurality of light sheets in a preferred configuration of the invention. The light sheets lie parallel to one another with their light sheet planes. Depending on the type of experiment, the illumination optical units respectively generate light sheets of different colors or light sheets of the same color. Multi-colored light sheets can also be congruent for the purposes of generating a multiple excitation in the at least one flow channel. Otherwise, a manipulation is carried out in the intersection region of the first light sheet with the at least one flow channel, for example a reaction is generated or a fluorescence is excited, which is observed with the second light sheet. In a particularly preferred configuration, the plurality of light sheets are generated by the same illumination optical unit. For two light sheets, this can be implemented, for example, with the aid of a controlled scanner that switches between two light sheet planes disposed in parallel. Here, the scanner is coupled via a controller to a switching apparatus which ensures that the light sheet is switched off during the switching process.

As an alternative or in addition thereto, it is also possible for the flow channel to be embodied on the channel carrier in such a way that it forms a plurality of intersection regions with the light sheet, which can be implemented, for example, by virtue of the at least one flow channel having a meandering embodiment. In this case, only one light sheet is required to observe the sequence of a reaction over time provided that the spectral range of the light sheet is equally suitable for excitation and detection; otherwise, a plurality of light sheets of different colors can be overlaid.

In another configuration, the flow channel is embodied with a changing diameter along the flow direction, facilitating mechanical manipulations of the samples within the meaning of a deformation. The sample is then observed, for example, once before the deformation and once in the deformed state, for the purposes of which two light sheets are used if the flow direction does not change or a single light sheet is used if the at least one flow channel is embodied in such a way that the flow direction changes with respect to a superordinate coordinate system, as is the case in the meandering embodiment of the flow channel.

Advantageously, the absolute value of the flow speed in the at least one flow channel can also be variably set by means of a speed control device and be adapted to the experimental conditions. The speed can be regulated, for example, via valves on the feed line and/or discharge line.

So-called phase retrieval algorithms such as the Transport of Intensity Equation (TIE), for example, can also be used to determine phase information with respect to the detected light if an image stack is generated from at least three images at different positions within an object. Since the sample—the object—moves with the flow through the focal plane of the detection optical unit, only at least 3 images have to be taken at a suitable time interval, in contrast to conventional microscopy, where the sample or the objective must be displaced along the optical axis. Moreover, the apparatus can be combined with other detection devices and cameras, such as normal incident light microscopes or further light sheet microscopic arrangements, for example.

It is understood that the features specified above and the features yet to be explained below can be used not only in the specified combinations, but also in other combinations or on their own, without departing from the scope of the present invention.

BRIEF DESCRIPTION OF THE DRAWINGS

The invention is explained in even greater detail below for example with reference to the accompanying drawings, which also disclose features essential to the invention. In the figures.

DETAILED DESCRIPTION OF THE DRAWINGS

Figure 1:
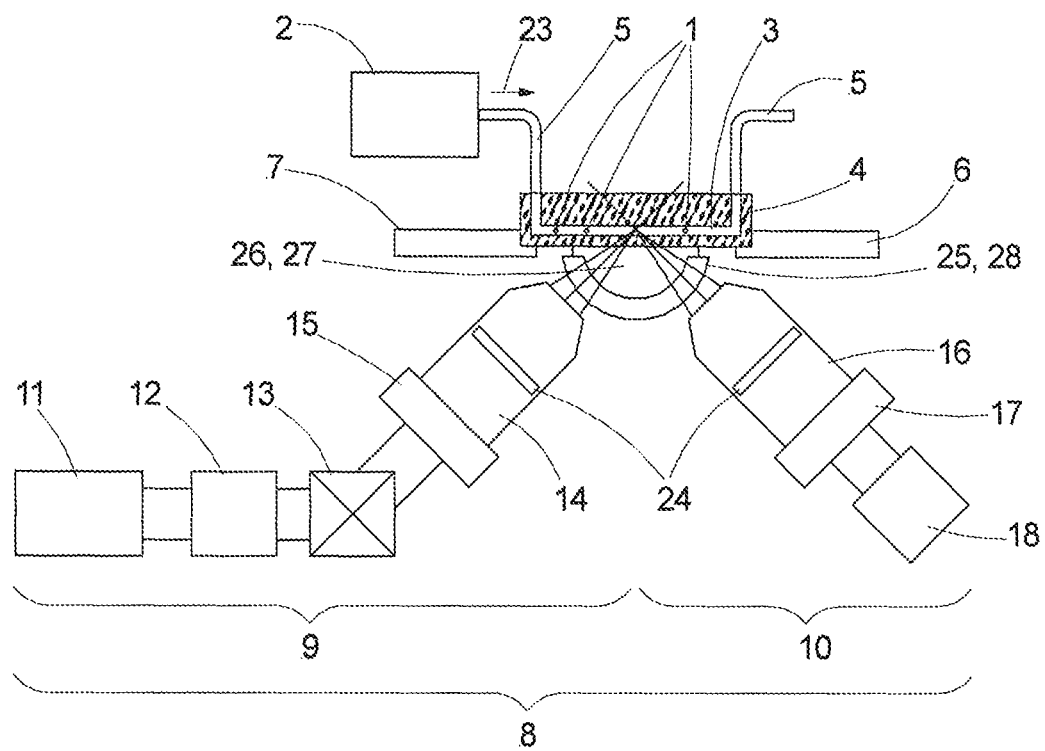
FIG. 1 schematically shows structure of an apparatus for optically manipulating a multiplicity of samples.

First of all, FIG. 1 shows the basic structure of an apparatus for optically manipulating a multiplicity of biological samples 1, which have been labeled with fluorescent markers. The samples 1, which are generally in a sample batch in a carrier liquid, for example from a multiplicity of different cells from a tissue sample, are initially prepared, i.e., labeled with fluorescent markers, and then fed to a channeling device 2 in which the samples 1 are channeled and supplied to at least one flow channel 3. The channeling device 2, which is also referred to as a separating device, can have, e.g., a funnel-shaped opening in the direction of the flow channel 3, said opening being dimensioned such that the samples can only pass through individually. This can be assisted by fluidic measures, the diameter of the opening advantageously also being able to be varied. Typical samples are cells which, as a rule, have sizes of between 1 µm and 30 µm; the diameter of the at least one flow channel 3, which, as a rule, has a tubular configuration, is matched to these cell sizes and often only slightly larger than the maximum diameter of the samples to be examined 1 so that the latter do not clog the flow channel 3. Here, flow channels 3 with relatively large diameters of, for example, 40 µm and more can also be used for relatively small samples with diameters of less than 5 µm if appropriate measures are taken to ensure that samples 1 enter the at least one flow channel 3 in succession where possible; by way of example, this can be achieved by way of variable-size inlet openings at the transition from the channeling unit 2 to the flow channel 3. However, due to the specific illumination and detection, which are explained in more detail below, it is harmless if a plurality of samples 1 are located in a flow channel 3 at the same time or next to one another. Moreover, the at least one flow channel 3 is also coupled to a pump device—not shown here—which serves to produce a flow; this is denoted here by a flow direction 23. An appropriate control and the utilization of valves allows the flow speed and/or the flow direction to be varied, depending on the analyses to be carried out.

The at least one flow channel 3 is embodied on or in a channel carrier 4, which can be a microfluidic chip, for example. Such microfluidic chips can be configured or manufactured for a multiplicity of analyzes and/or experiments in a targeted manner; therefore, the channel carrier 4 is preferably interchangeable. The flow channel 3 is connected to the channeling device 2 via a tube line 5, a tube line 5 for removing the samples 1 can also be attached to the other end of the flow channel 3 in the channel carrier 4; then, the samples can also, where required, be sorted, be fed to further analyses or experiments or alternatively be disposed of.

The channel carrier 4 is displaceable in all three spatial directions, for the purposes of which it is disposed on a correspondingly displaceable sample stage 6 in this case, which sample stage can additionally be rotatable in a plane which is defined by a support surface 7 of the sample stage 6. The flow direction 23 in the at least one flow channel 3 also lies in this plane, at least in that region in which the analysis takes place.

The samples 1 move along the flow direction 23 with a mean flow velocity between the supply and discharge lines in the at least one flow channel 3, the samples 1 also remaining in place for a short period of time when the speed is manipulated not being precluded. In the case of a flow channel 3 with a tubular cross section, the flow direction 23 is along the channel, i.e., parallel to the longitudinal axis of the tubular channel, in any case.

In order to carry out the analysis, the apparatus has illumination means which are used to illuminate the samples 1 and which are preferably also configured in this case as excitation means for excitation of the samples 1 in the at least one flow channel 3 to emit fluorescence signals. The samples emit detection light; this can be done passively in the form of scattered light or else actively in the form of emitted fluorescence signals. The detection light is detected by detection means, which are also part of the apparatus. The apparatus moreover has analysis means for analyzing the detected detection light, such as the detected fluorescence signals, for example. Here, this can be, e.g., an appropriately programmed computer as an evaluation unit with an output unit, for example a monitor.

In the apparatus shown in FIG. 1, the illumination or excitation means and the detection means are realized by a light sheet microscope 8, which is shown here in an inverted configuration. Such an inverted configuration is useful if the structures above the sample stage 6 require too much space, for example on account of the tube lines 5 and the equipment connected thereto; however, this is not mandatory—an arrangement of the light sheet microscope above the channel carrier 4 is also conceivable. The light sheet microscope 8 shown here comprises an illumination optical unit 9 and a detection optical unit 10. The illumination optical unit 9 is shown on the left-hand side of FIG. 1. Light from a laser module 11—for example, a plurality of lasers with different wavelengths could be accommodated here and a selection could be made between different wavelengths, wherein a plurality of wavelengths could also be selected at the same time—is steered via a beam-shaping module 12 and a scanning module 13—which is used, for example, to generate a quasi-static light sheet and/or set an angle—onto an illumination objective 14, which images the light sheet in the light sheet plane, which corresponds to the optical axis of the illumination objective 14 in this case, into the channel carrier 4 and the flow channel 3. The focus of the illumination objective 14, i.e., the point at which the light sheet has the thinnest extent, can be controlled with the aid of a drive, for example with the aid of a piezo-drive 15, such that said focus lies in the flow channel should only one flow channel be used, for example. As an alternative or in addition thereto, the sample stage 6 can also be adjusted.

An exemplary detection optical unit 10 is shown on the right-hand side; the latter comprises a detection objective 16, which can be adjusted analogously to the illumination objective 14 by means of a drive, likewise by means of a piezo-drive 17 in this case. The optical axis of the detection objective 16 includes a non-zero angle, a right angle in this case, with the light sheet plane in which the optical axis of the illumination objective 14 lies. However, this is not mandatory: For the method to work, a non-zero angle between the plane of the light sheet and the optical axis of the detection objective 16 is sufficient. However, disposing the two optical axes of the objectives at an angle of 90° with respect to one another offers the advantage that the focal plane of the detection objective 16 then is identical to the light sheet plane, and hence all regions of the light sheet plane, i.e., the entire oblique cross section through the flow channel 3 in this case, can be imaged in focus provided said regions are captured by the detection object 16. Detection light emitted from the sample 1, for example fluorescence light emitted from the latter following an appropriate excitation, is steered onto a detection module 18 by the detection objective 16; a plurality of detection modules can also be used here with the aid of beam splitters. If the sample is illuminated simultaneously or quasi-simultaneously by a light sheet comprising a plurality of wavelengths, the detection can be carried out according to different wavelengths, for example. As a rule, the detection module 18 contains a planar detector which registers the intensity and, where applicable, the color, and converts this into a corresponding electrical signal, that is then transmitted to an analysis unit and an image processing unit and processed there.

Figure 2:
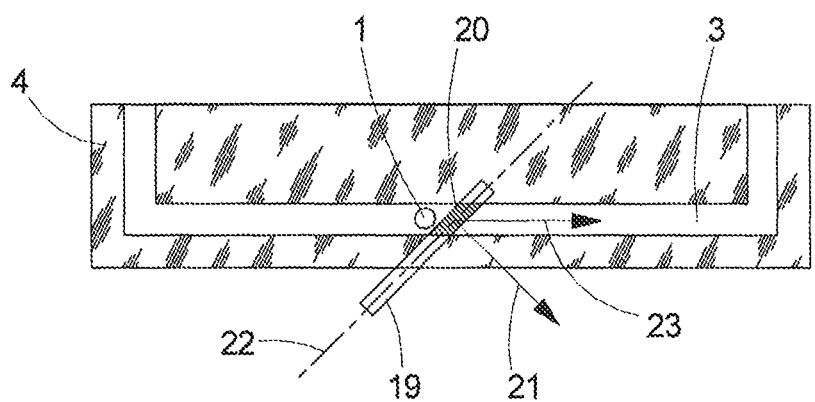
FIG. 2 shows a detail of the channel carrier and the relative position of a light sheet.

FIG. 2 shows a channel carrier 4 in detail. The at least one flow channel 3 is embodied in the channel carrier 4, for example in a microfluidic chip; here, as a rule, this is a transparent, plate-shaped body with two large surfaces that are parallel to one another and with edge surfaces that connect the two large surfaces. The at least one flow channel 3 is embodied as a cavity, which is open on two sides, in the transparent, plate-shaped body. In the shown apparatus, a light sheet 19 is aligned in such a way that it intersects the at least one flow channel 3 in an intersection region 20 and the normal 21 of the light sheet plane 22 includes a non-zero angle with the flow direction 23 in the intersection region 20; by way of example, here the samples 1 are excited to emit fluorescence signals in the intersection region 20. There is transparent material of the channel carrier 4 between the intersection region 20 and the illumination objective 14 and between said intersection region and the detection objective 16, and, on account of the chosen arrangement, the optical axes of the detection objective 16 and the illumination objective 14 are not disposed at right angles but in oblique fashion with respect to the interfaces between the channel carrier 4 and flow channel 3 and between the underside of the channel carrier 4 and a medium located therebelow. This results in aberrations. In order to correct these aberrations, the light sheet microscope 8 may have various correction means, shown in exemplary fashion in FIG. 1, which can be used individually or in combination. By way of example, special lenses, so-called "virtual relays", can be disposed upstream of the objectives. Said virtual relays are free-form lenses which are designed to correct the aberrations for a given thickness of the channel carrier 4—in this case between the flow channel 3 and the base, i.e., the underside of the channel carrier 4—and for a given medium which is located between the free-form lens and the channel carrier—e.g., air or an immersion medium. Aberrations caused by immersion media can be corrected with the aid of meniscus lenses, wherein corrections for a plurality of immersion media can also be undertaken by a single meniscus lens, depending on the design thereof. However, aberrations due to the oblique passage of light through the channel carrier 4 between the underside thereof and flow channel 3 cannot be corrected by meniscus lenses. Finally, wavefront manipulators, so-called Alvarez plates, can also be used to correct both types of aberrations. The thickness range of a virtual relay, for example, can be extended with the aid of wavefront manipulators.

Firstly, in the configuration shown here, respective wavefront manipulators 24—adjustable wavefront manipulators—are disposed in the illumination objective 14 and in the detection objective 16. Secondly, there is a virtual relay 25 between the objectives of the light sheet microscope 8 and the channel carrier 4, said virtual relay is illustrated here as one lens but could also comprise a plurality of lenses. By way of example, air 26 or an immersion liquid 27, as a medium, is situated between the virtual relay 25 and the underside of the channel carrier 4. The correction means—the virtual relay 25 or a meniscus lens 28 and wavefront manipulators 24—can be used in combination or else individually, if necessary depending on the medium located on the underside of the channel carrier 4. Moreover, further correction mechanisms, such as further auxiliary lenses or free-form lenses, which are integrated into the objectives, can naturally also be used.

Samples 1, which propagate in the at least one flow channel 3 along the flow direction 23 as shown in FIG. 2, are excited to fluoresce by the light sheet 19 in the intersection region 20, provided that they have been labeled accordingly beforehand. The intersection region 19 is a small volume since the light sheet also has a finite extent perpendicular to the light sheet plane in the regions of greatest focus, said extent, however, being much smaller than the extent of the light sheet in the plane and being negligible in relation thereto. For the sake of clarity, however, the intersection region has been shown somewhat enlarged here. The fluorescence signals are detected by the detection optical unit 10 and evaluated quantitatively by analysis means (not shown), as is also conventional in the prior art. However, a complete image of the sample 1 can also be recorded in addition to the fluorescence signals; moreover, image stacks can also be recorded without having to mechanically move any of the components since the sample 1 moves along the flow direction 23 through the focal plane of the detection objective 16, which generally corresponds to the light sheet plane 22, on account of the flow speed. The recorded image data, for example shape, morphology, spatial structure, which are available here with a higher resolution than is possible in the prior art, can be used for further analysis and also, where applicable, for a corresponding sorting of the samples on the basis of further parameters in addition to fluorescence. Separate focusing on the sample is not necessary. Nor do the samples have to be fluidically focused in the flow channel 3 since the light sheet 19 covers the cross section of the flow channel 3. This has the advantage that even relatively large flow channels 3 can be used and higher cell densities can be measured, particularly if spatial imaging is used.

Figure 3:
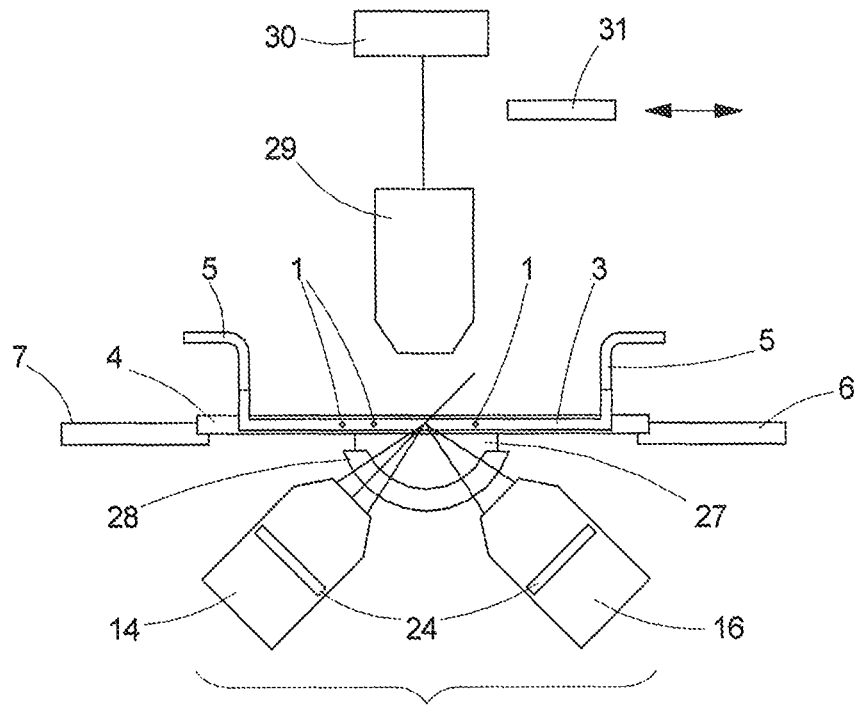
FIG. 3 shows a second configuration of such an apparatus.
Figure 4:
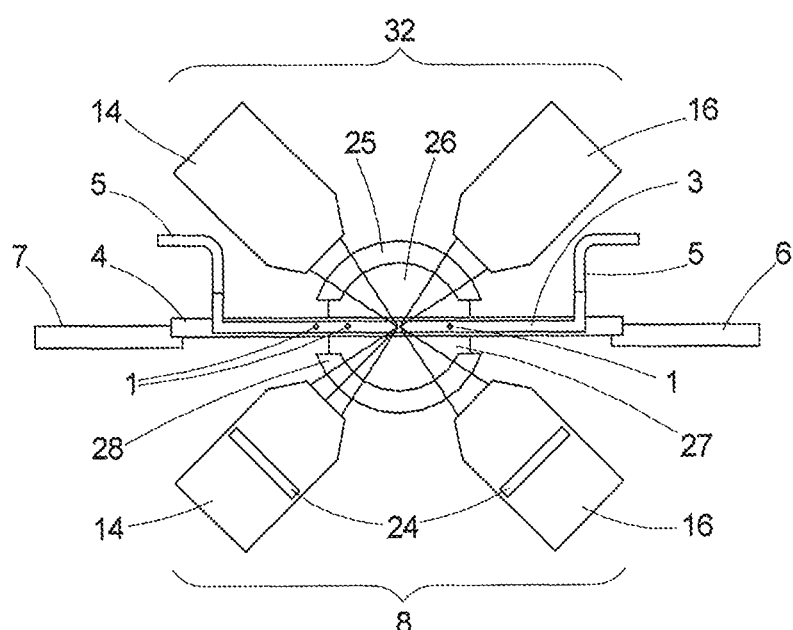
FIG. 4 shows a third configuration of such an apparatus.

The apparatus can be combined with further detection devices; examples therefor are shown in FIGS. 3 and 4. In addition to the light sheet microscope 8 illustrated here in simplified fashion, FIG. 3 shows a conventionally disposed microscope objective 29, which is connected to a camera 30. With respect to the flow channel 3 or the transparent, plate-shaped channel carrier 4, it is aligned in such a way that it is oriented perpendicular to the interfaces so that no correction of aberrations caused by oblique light incidence is necessary in this case. Two-dimensional images with lower resolution can also be generated in this way with the help of an element for increasing the depth of field (EDOF element) 31, which can be introduced into and removed from the beam path. FIG. 4 shows, in addition to the inverted light sheet microscope 8, a further light sheet microscope 32 arranged above the flow channel 3; the light sheets intersect. The same configuration can be used for both light sheet microscopes 8, 32; however, different configurations can be used by all means. In the present case, the correction means and the media between the objectives and the flow channel 3 differ. The light sheets 19 can have different colors; they can also be produced in different ways. By way of example, use can be made of static light sheets that are produced with the aid of cylindrical lenses or use can be made of light sheets based on other shapes, so-called $sinc^3$ light sheets, light sheets produced on the basis of Mathieu rays or Bessel rays, or else grating light sheets which are produced with the aid of gratings.

Various channel carriers or microfluidic chips, which are particularly suitable for use with extensive light sheet illumination, are described below. Such channel carriers are illustrated in FIGS. 5-8.

Figure 5:
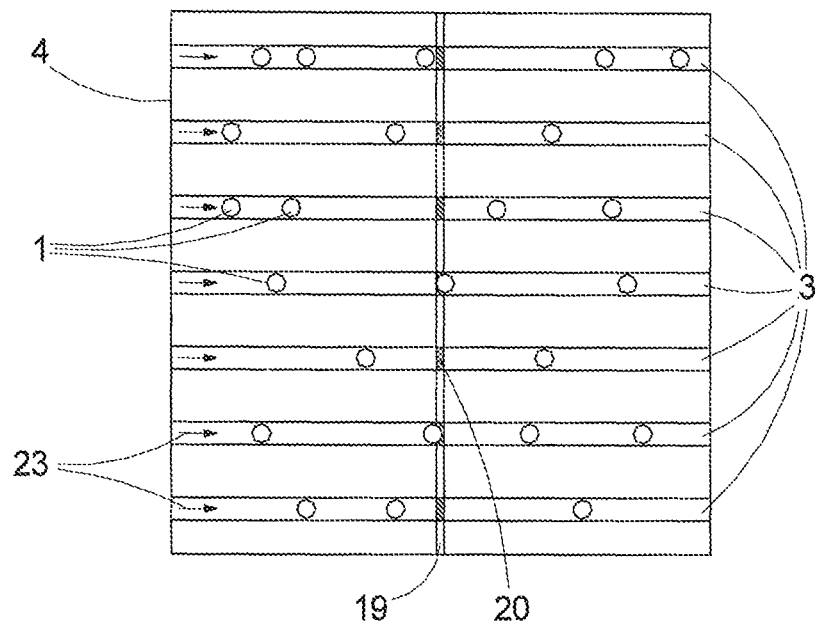
FIG. 5 shows a configuration of a channel carrier.

Since the light sheet in the plane has a greater extent than the diameter of the flow channels 3—for example, a width of 400 μm and more, and a length ranging from 20 μm to 200 μm, depending on the chosen illumination optical unit—and since the focal plane of the detection objective 16 lies in the light sheet plane 22, use can be made of channel carriers 4 on which a multiplicity of parallel flow channels 3 are disposed. Such an example is illustrated in FIG. 5. Here, the flow channels 3 could comprise common feed and discharge lines if all samples 1 originate from a single large sample. However, the flow channels 3 could likewise be grouped into a plurality of groups, the members of each group having the same feed and discharge lines but there being dedicated supply and discharge lines for each group. This facilitates examination of samples 1 from different sample batches in parallel. Moreover, each flow channel 3 may have a dedicated feed line and a dedicated discharge line. Additionally, the discharge line can be common to all flow channels 3, even if these are in different groups; by way of example, this is applicable where the samples 1 are no longer used subsequently but should be supplied to a common waste container.

The light sheet 19 can be a multi-colored light sheet, which is particularly advantageous if samples 1 from various, differently labeled sample batches should be examined in parallel or if a single sample 1, for example a cell, was labeled by a plurality of dyes that emit fluorescence at different wavelengths depending on the excitation wavelength; additionally, the same light sheets or light sheets with different colors can be disposed in parallel with respect to one another at predetermined intervals, it being possible to detect said light sheets using a common detection optical unit in the case of an appropriate configuration.

Figure 6:
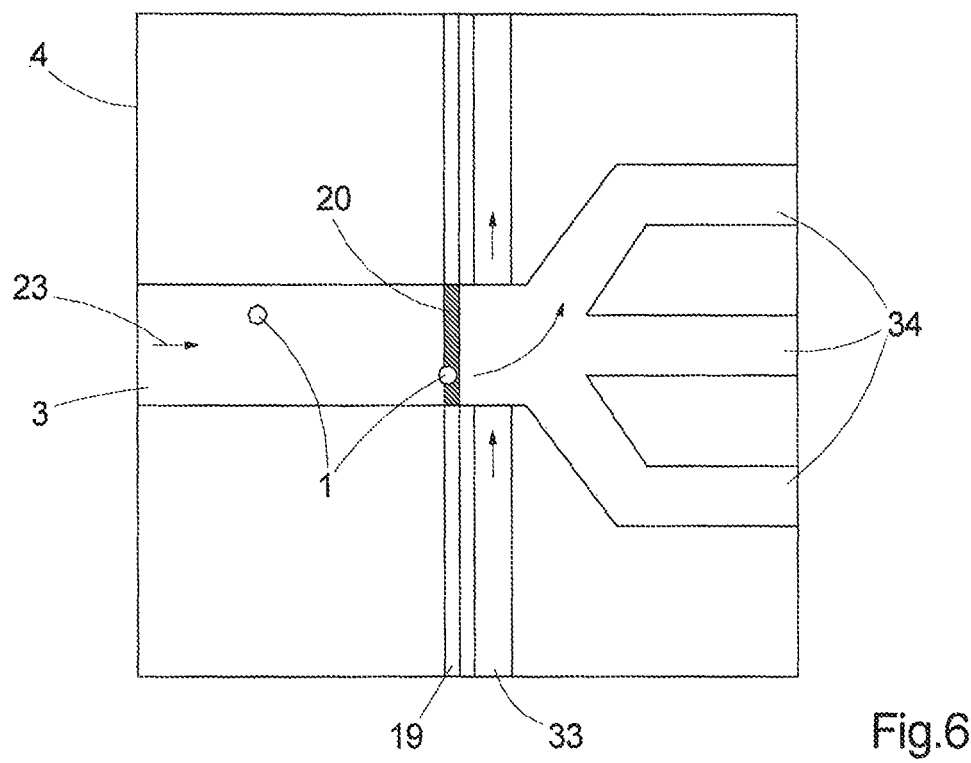
FIG. 6 shows a second configuration of a channel carrier.
Figure 7:
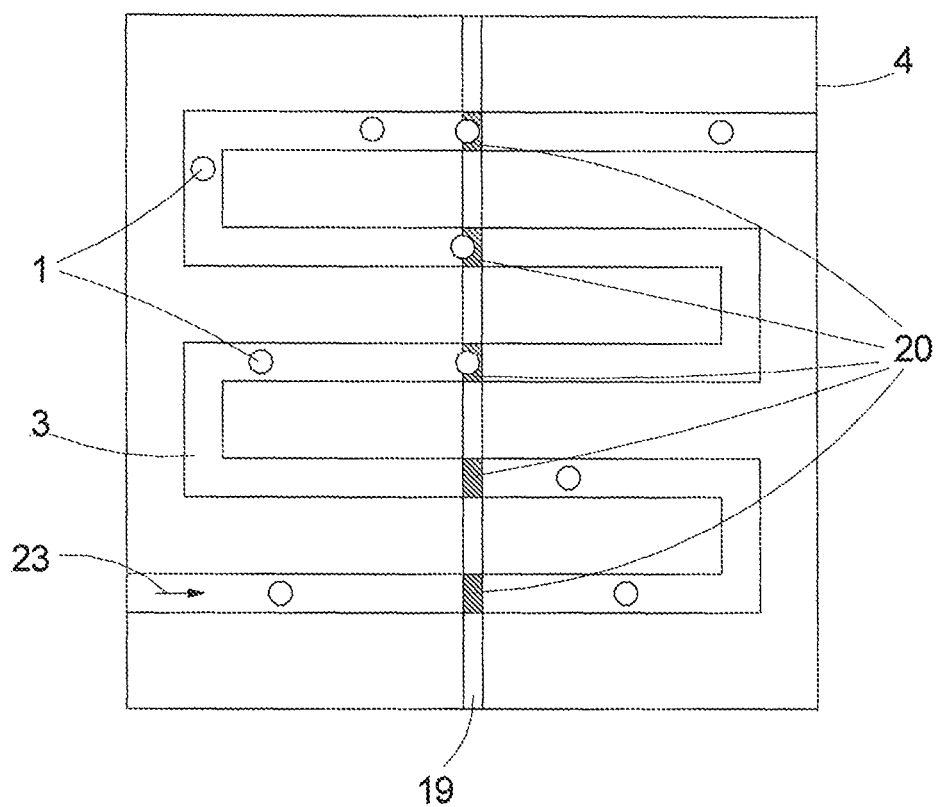
FIG. 7 shows a third configuration of a channel carrier.

The results of the analysis of the data detected by the detection optical unit 10 can also be used to subsequently sort the samples 1 by means of a sorting unit, after said samples have passed through the light sheet. An example of such a channel carrier 4 is illustrated in FIG. 6. The sorting unit comprises a sorting mechanism 33 and branch channels 34. The sorting mechanism 33 can be configured in a manner known from the prior art; by way of example, it can manipulate the samples 1 in electrophoretic, acoustic or optical fashion or deflect said samples from the flow direction such that these are steered into one of a plurality of branch channels 34. In turn, this can be implemented simultaneously for a plurality of channels since the light sheet has a large area.

The fact that the light sheet has a large planar extent in comparison with the channel cross section can also be used to examine the behavior of samples 1 over time, for example if use is made of channel carriers 4 that have a meandering flow channel 3 that is intersected by the light sheet 19 a plurality of times so that a certain number of intersection regions 20 that are disposed in succession in the flow direction 23 arise in the flow channel 3. This is illustrated in exemplary fashion in FIG. 7. The intersection regions 20 are hatched. In conjunction with the described apparatus, such a configuration of a channel carrier 4 is particularly suitable for examining the behavior of a sample over time following a manipulation. To this end, it may be advantageous to overlay light sheets of different colors and, where applicable, to control these in time should this be deemed necessary from the type of experiment or analysis. In the structure shown in FIG. 7, a sample then initially enters into the flow channel 3 from the left and passes through the first of the intersection regions 20. A manipulation is undertaken there; by way of example, this may simply consist in an excitation of fluorescent emissions. Other possible manipulation processes include, for example, photoactivation—i.e., putting a sample 1 into a fluorescence-capable state—and uncaging, photoconversion—a sample 1 is converted from a first state, in which fluorescence signals at a first wavelength are emitted, into a second state, in which the sample 1 emits fluorescence signals at a second wavelength—or FRAP (fluorescence recovery after photobleaching): Here, a locally high intensity is radiated into a sample 1, for example a cell, locally triggering a photobleaching process with respect to the fluorescence at this point. A short time later, there is a weak excitation at a further position and images are recorded, said images being analyzed to the effect of the extent to which the fluorescence was reestablished by local diffusion. If need be, a further reaction can be triggered by a further, overlaid light sheet. The sample 1 departs the intersection region 20 again and is guided along the flow channel 3 by the flow, until it meets the next of the intersection regions 20. There, the first observation or a further manipulation can then be implemented with the aid of the same or a different light sheet. A further observation can be made in a further intersection region 20, optionally yet again with another light sheet. In principle, the light sheets of all colors that are overlaid can be left permanently switched on; however, depending on the flow speed and the length of the sections of the flow channel 3 between respectively two intersection regions 20, there could also be a time control of the light sheet in such a way that when a sample 1 passes through an intersection region 20, only the light sheet required there is switched on. This procedure can be used, in particular, when examining a few samples that flow through the flow channel 3 at relatively low speeds.

Figure 8A:
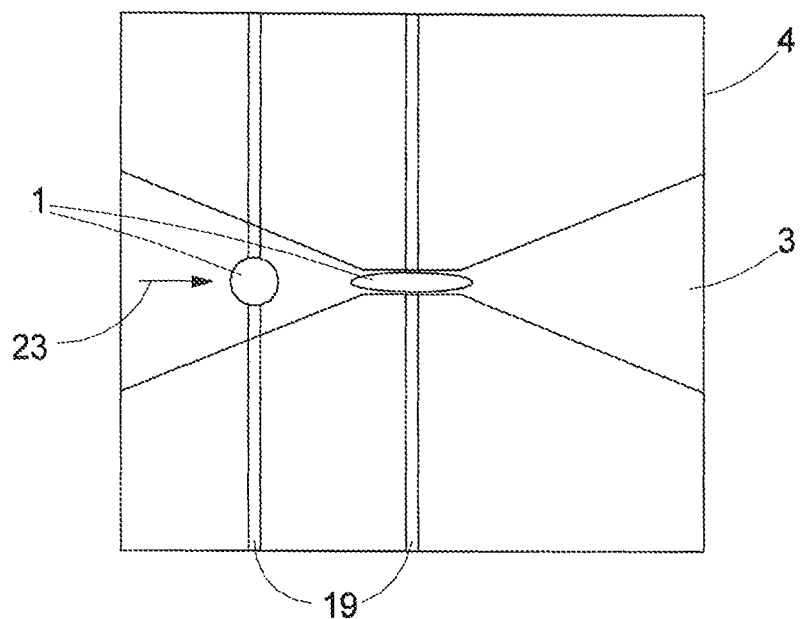
FIG. 8*a* shows a fourth configuration of a channel carrier.
Figure 8B:
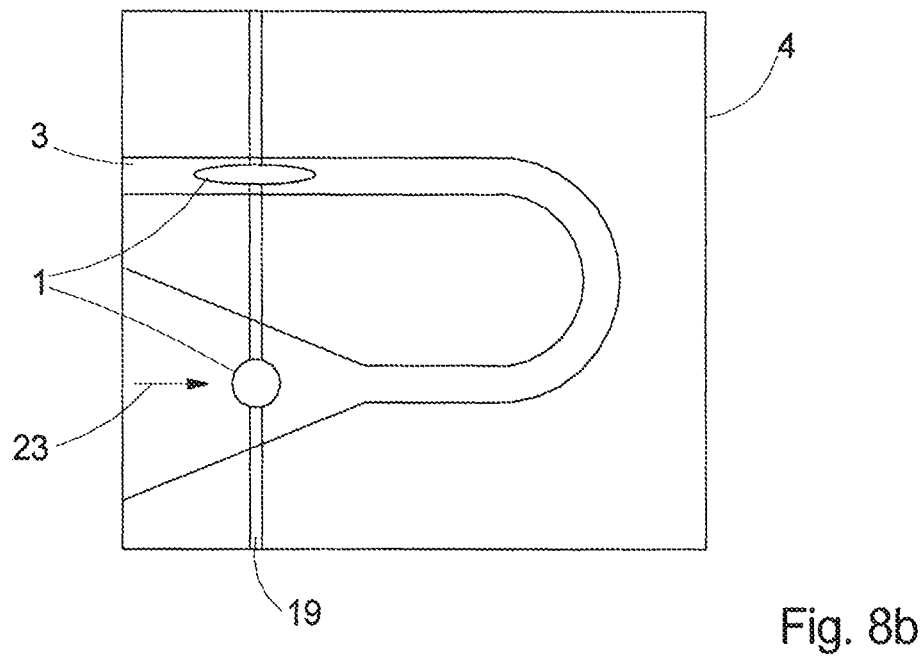
FIG. 8*b* shows a fifth configuration of a channel carrier.

Two further configurations of channel carriers 4 are shown in FIGS. 8*a* and 8*b*. Here, the at least one flow channel 3 changes in terms of diameter in the flow direction 23; it narrows in this case. This constriction can be used to mechanically deform the samples 1, in particular cells. As a result of appropriate positioning of the light sheets—as shown in FIG. 8*a* in exemplary fashion—it is possible to record an image of the sample prior to the deformation and an image during the deformation; spatial images of the deformed cell can be readily generated in this case as a result of the flow. Alternatively, the flow channel 3 can be deflected and guided back after the constriction such that the deformed sample runs through the same light sheet again. A further image can be recorded once the flow channel 3 widens again; said image can be used to analyze whether permanent deformations have occurred.

The apparatus described above can be used for the optical manipulation and analysis of biological samples, which are labeled by fluorescence markers, in particular for a multiplicity of samples within a short time. In addition to a quantitative analysis, it is possible to generate image data both in a two-dimensional and in a spatial representation with a high resolution such that high-resolution images are also available for more detailed analyses. As a result, it is possible to generate further parameters for a possible sorting of samples. Here, both a high sample throughput for the analysis and a detailed analysis of each individual sample are possible.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

1 Sample
 2 Channeling device
 3 Flow channel
 4 Channel carrier
 5 Tube line
 6 Sample stage
 7 Support surface
 8 Light sheet microscope
 9 Illumination optical unit
10 Detection optical unit
11 Laser module
12 Beam-shaping module
13 Scanning module
14 Illumination objective
15 Piezo-drive
16 Detection objective
17 Piezo-drive
18 Detection module
19 Light sheet
20 Intersection region
21 Normal of the light sheet plane
22 Light sheet plane
23 Flow direction
24 Wavefront manipulator
25 Virtual relay
26 Air
27 Immersion liquid
28 Meniscus lens
29 Microscope objective
30 Camera
31 EDOF element
32 Further light sheet microscope
33 Sorting mechanism
34 Branch channel

What is claimed is:

1. A method for optically examining a multiplicity of microscopic samples, comprising:
   channelling the samples from the multiplicity thereof and successively guiding the samples in at least one flow channel by means of a flow, by virtue of moving the samples along a specified flow direction;
   illuminating the samples;
   detecting and analysing light emitted from the samples; wherein
   the samples are illuminated by virtue of at least one light sheet with a light sheet plane being directed on the at least one flow channel and the light sheet being aligned so that it intersects the flow channel in an intersection region and the normal of the light sheet plane includes a non-zero angle with the flow direction in the intersection region; and
   registering the light emitted from the samples by an imaging detection optical unit, the focal plane of which lies in the intersection region in the light sheet plane or parallel to the light sheet plane such that a cross section of the at least one flow channel lies completely within the intersection region in the focal plane.

2. The method as claimed in claim 1, wherein the detection optical unit detects an image or, sequentially in time, an image stack of individual images, in each case of a sample flowing through the intersection region.

3. The method as claimed in claim 2, wherein individual images of the image stack are combined to form a spatial representation.

4. The method as claimed in claim 1, further comprising labelling the samples with fluorescent markers prior to the examination and excited to emit fluorescence signals by the at least one light sheet, and detecting and analyzing the fluorescence signals.

5. The method as claimed in claim 1, further comprising sorting the samples on the basis of the analysis of the light detected by the detection optical unit, possibly on the basis of information from images and/or of fluorescence signals.

6. The method as claimed in claim 1, wherein at least one light sheet intersects the at least one flow channel multiple times in intersection regions for the purposes of examining the behavior of the samples over time.

7. The method as claimed in claim 1, wherein at least one light sheet intersects a multiplicity of flow channels.

8. The method as claimed in claim 1, wherein the samples are illuminated by a plurality of light sheets, by a plurality of light sheets at different wavelengths.

9. An apparatus for optically examining a multiplicity of microscopic samples, comprising a channeling device for channeling the samples and for successively feeding said samples to a channel;

at least one flow channel, in which the samples move along a specified flow direction, said at least one flow channel being the channel to which said samples are fed;

illumination means for illuminating the samples in the at least one flow channel for the purposes of emitting detection light;

detection means for detecting the detection light emitted from the samples;

analysis means for analyzing the detection light;

said illumination means including an illumination optical unit for generating at least one light sheet with a light sheet plane, wherein the light sheet is aligned with respect to the flow channel so that it intersects the flow channel in an intersection region and the normal of the light sheet plane includes a non-zero angle with the flow direction in the intersection region, as a result of which the samples are illuminated in the intersection region; and the detection means includes an imaging detection optical unit, the focal plane of which lies in the intersection region in the light sheet plane or parallel to the light sheet plane such that a cross section of the at least one flow channel lies completely within the intersection region in the focal plane.

10. The apparatus as claimed in claim 9, wherein the at least one flow channel is embodied on an interchangeable channel carrier.

11. The apparatus as claimed in claim 9, further comprising a multiplicity of parallel flow channels disposed on the channel carrier, said parallel flow channels preferably having feed and/or discharge lines that are separate from one another and an intersection region with the light sheet in each case.

12. The apparatus as claimed in claim 9, further comprising a sorting unit disposed downstream of the light sheet and/or a manipulation unit disposed upstream and/or downstream of the light sheet, in each case with respect to the flow direction.

13. The apparatus as claimed in claim 9, wherein the illumination means are configured to emit light for exciting fluorescent marker-labeled samples to emit fluorescence signals.

14. The apparatus as claimed in claim 9, wherein said detection means includes detectors for detecting the fluorescence signals and/or stray light.

15. The apparatus as claimed in claim 9, wherein the illumination means has an illumination optical unit or a plurality of illumination optical units for generating a plurality of light sheets, the light sheet planes of which are parallel to one another, with each light sheet preferably having a different color.

16. The apparatus as claimed in claim 9, wherein the at least one flow channel has a diameter that changes along the flow direction and/or in a meandering fashion in relation to the relative position of the light sheet for the purposes of forming a plurality of intersection regions therewith.

\* \* \* \* \*

UNITED STATES PATENT AND TRADEMARK OFFICE
CERTIFICATE OF CORRECTION

PATENT NO. : 11,371,927 B2
APPLICATION NO. : 16/648863
DATED : June 28, 2022
INVENTOR(S) : Thomas Kalkbrenner, Joerg Siebenmorgen and Thomas Ohrt Page 1 of 1

It is certified that error appears in the above-identified patent and that said Letters Patent is hereby corrected as shown below:

In the Specification

Column 1, Line 58 now reads: "manipulate the sample if for example, the sample is labeled"
Should read: -- manipulate the sample if, for example, the sample is labeled --

Column 4, Line 9 now reads: "opment vol. 136, pp. 1963 if WO 2012/110488 A2 and WO"
Should read: -- opment vol. 136, pp. 1963 ff WO 2012/110488 A2 and WO --

Signed and Sealed this
Sixth Day of September, 2022

Katherine Kelly Vidal
*Director of the United States Patent and Trademark Office*